US010221742B2

(12) United States Patent
Ballinger et al.

(10) Patent No.: US 10,221,742 B2
(45) Date of Patent: Mar. 5, 2019

(54) CO SLIP CATALYST AND METHOD OF USING

(71) Applicant: JOHNSON MATTHEY PUBLIC LIMITED COMPANY, London (GB)

(72) Inventors: Todd Howard Ballinger, Wayne, PA (US); Hai-Ying Chen, Wayne, PA (US); Julian Peter Cox, Wayne, PA (US); Shadab Sharif Mulla, Audubon, PA (US); Jeffery Scott Rieck, Wayne, PA (US); Erich Conlan Weigert, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/631,812

(22) Filed: Jun. 23, 2017

(65) Prior Publication Data
US 2017/0284262 A1 Oct. 5, 2017

Related U.S. Application Data

(60) Continuation of application No. 15/000,187, filed on Jan. 19, 2016, now Pat. No. 9,694,349, which is a division of application No. 14/471,683, filed on Aug. 28, 2014, now Pat. No. 9,266,064.

(60) Provisional application No. 61/871,080, filed on Aug. 28, 2013.

(51) Int. Cl.
B01J 21/04 (2006.01)
B01J 21/06 (2006.01)
B01J 21/08 (2006.01)
B01J 21/10 (2006.01)
B01J 21/12 (2006.01)
B01J 21/14 (2006.01)
B01J 23/02 (2006.01)
B01J 23/10 (2006.01)
B01J 23/44 (2006.01)
B01J 23/58 (2006.01)
B01J 23/63 (2006.01)
B01J 23/64 (2006.01)
B01J 35/04 (2006.01)
F01N 3/28 (2006.01)
B01D 53/94 (2006.01)
B01J 37/02 (2006.01)
B01J 35/00 (2006.01)
F01N 3/10 (2006.01)
F01N 3/20 (2006.01)

(52) U.S. Cl.
CPC ......... *F01N 3/2803* (2013.01); *B01D 53/944* (2013.01); *B01D 53/9477* (2013.01); *B01J 23/10* (2013.01); *B01J 23/44* (2013.01); *B01J 23/63* (2013.01); *B01J 35/0006* (2013.01); *B01J 35/04* (2013.01); *B01J 37/0215* (2013.01); *B01J 37/0244* (2013.01); *B01J 37/0248* (2013.01); *F01N 3/101* (2013.01); *F01N 3/2066* (2013.01); *B01D 2255/1023* (2013.01); *B01D 2255/2065* (2013.01); *B01D 2255/2092* (2013.01); *B01D 2255/20715* (2013.01); *B01D 2255/407* (2013.01); *B01D 2255/904* (2013.01); *B01D 2257/502* (2013.01); *B01J 37/0246* (2013.01); *F01N 2370/02* (2013.01); *F01N 2510/06* (2013.01); *Y02A 50/2341* (2018.01); *Y02T 10/22* (2013.01)

(58) Field of Classification Search
CPC .......... B01J 21/04; B01J 21/06; B01J 21/063; B01J 21/066; B01J 21/08; B01J 21/10; B01J 21/12; B01J 21/14; B01J 23/02; B01J 23/10; B01J 23/44; B01J 23/58; B01J 23/63; B01J 23/64; B01J 35/04
See application file for complete search history.

(56) References Cited

U.S. PATENT DOCUMENTS

| | | | |
|---|---|---|---|
| 5,597,771 A | 1/1997 | Hu et al. | |
| 5,776,417 A | 7/1998 | Frost et al. | |
| 6,087,298 A * | 7/2000 | Sung | B01D 53/945 502/303 |
| 7,276,212 B2 * | 10/2007 | Hu | B01D 53/9454 422/168 |
| 7,329,629 B2 * | 2/2008 | Gandhi | B01D 53/945 502/304 |
| 7,811,962 B2 * | 10/2010 | Hu | B01D 53/9454 502/304 |
| 8,202,819 B2 * | 6/2012 | Kohara | B01D 53/9468 422/169 |
| 8,291,695 B2 | 10/2012 | Perry et al. | |
| 8,771,624 B2 | 7/2014 | Ikeda et al. | |
| 2002/0139112 A1 | 10/2002 | Onodera et al. | |
| 2004/0254069 A1 | 12/2004 | Ito | |

(Continued)

FOREIGN PATENT DOCUMENTS

| | | |
|---|---|---|
| EP | 1864713 A1 | 12/2007 |
| GB | 2492175 A | 12/2012 |
| JP | 2010270695 | 12/2010 |
| JP | 2013146693 A | 8/2013 |
| RU | 2009111589 | 10/2010 |
| RU | 2010135263 | 4/2012 |
| WO | 2010083355 A2 | 7/2010 |
| WO | 2012128297 A1 | 9/2012 |
| WO | 2012166868 A1 | 12/2012 |

Primary Examiner — Cam N. Nguyen

(57) ABSTRACT

A CO slip catalyst, for treating an exhaust gas from a lean burn internal combustion engine, is disclosed. The CO slip catalyst comprises palladium and a ceria-containing material. The invention also includes a method for oxidizing excess CO in an exhaust gas, wherein the excess CO results from the periodic contact of an upstream catalyst under rich exhaust conditions. The method comprises contacting the excess CO in the exhaust gas with a CO slip catalyst at a temperature in the range of 100 to 700° C.

7 Claims, No Drawings

(56) References Cited

U.S. PATENT DOCUMENTS

| | | |
|---|---|---|
| 2008/0066458 A1* | 3/2008 | Toyoda ............... B01D 53/945 60/299 |
| 2008/0072578 A1 | 3/2008 | Kumar |
| 2008/0152565 A1 | 6/2008 | Dahl et al. |
| 2010/0111789 A1 | 5/2010 | Fajardie et al. |
| 2012/0186238 A1 | 7/2012 | Akamine et al. |
| 2014/0065043 A1 | 3/2014 | Kato et al. |

* cited by examiner

CO SLIP CATALYST AND METHOD OF USING

CROSS-REFERENCE TO RELATED APPLICATIONS

This application is a Continuation of U.S. patent application Ser. No. 15/000,187, scheduled to issue on Jul. 4, 2017 with U.S. Pat. No. 9,694,349, which is a Divisional of U.S. Pat. No. 9,266,064, issued on Feb. 3, 2016, which claims priority benefit to U.S. Provisional Patent Application No. 61/871,080, filed Aug. 28, 2013, the disclosures of which are incorporated herein by reference in their entireties for all purposes.

FIELD OF THE INVENTION

The invention relates to a CO slip catalyst for treating an exhaust gas from a lean burn internal combustion engine, and a method for treating excess CO in the exhaust gas.

BACKGROUND OF THE INVENTION

Internal combustion engines produce exhaust gases containing a variety of pollutants, including hydrocarbons, carbon monoxide (CO), nitrogen oxides, sulfur oxides, and particulate matter. Increasingly stringent national and regional legislation has lowered the amount of pollutants that can be emitted from such internal combustion engines. Many different techniques have been applied to exhaust systems to clean the exhaust gas before it is emitted to the atmosphere.

One proposed method for cleaning exhaust gases produced in lean burn applications utilizes a three-way catalyst (TWC) followed by a selective catalytic reduction (SCR) catalyst. This concept, as described in U.S. Pat. No. 8,216,521, is to operate lean for an extended period of time during which the CO and hydrocarbons in the engine exhaust gas stream will be primarily oxidized to $CO_2$ and $H_2O$ over the TWC. Periodic rich events are used to produce ammonia ($NH_3$) over the TWC. The $NH_3$ is stored and used by the downstream SCR catalyst to selectively reduce the $NO_x$ generated during the lean phase. The duration of these rich events requires optimization to provide adequate quantities of $NH_3$ to the SCR to meet $NO_x$ conversion targets. Unfortunately the consequence of longer rich events is the generation of excess CO in the exhaust. It is critical to maintain high conversions of hydrocarbons, $NO_x$, and CO during both lean and rich operating phases. As rich pulse times become longer to optimize the $NH_3$ generation, CO becomes the most difficult species to control using only a TWC.

It is desirable to develop new and improved catalysts and methods that enable longer rich events while maintaining a high level of CO conversion. We have discovered a new CO slip catalyst that is capable of converting a large concentration of CO generated during rich operation.

SUMMARY OF THE INVENTION

The invention is a CO slip catalyst for treating an exhaust gas from a lean burn internal combustion engine. The CO slip catalyst comprises palladium and a ceria-containing material. The invention also includes a method for oxidizing excess CO in an exhaust gas, wherein the excess CO results from the periodic contact of an upstream catalyst under rich exhaust conditions. The method comprises contacting the excess CO in the exhaust gas with a CO slip catalyst at a temperature in the range of 100 to 700° C. The invention leads to improved conversion of CO during both lean and rich operating phases.

DETAILED DESCRIPTION OF THE INVENTION

The invention is a CO slip catalyst. The CO slip catalyst comprises palladium and a ceria-containing material. Preferably, the CO slip catalyst consists essentially of, and more preferably consists of, palladium and the ceria-containing material. The ceria-containing material is preferably ceria, ceria-zirconia, ceria-zirconia-alumina, or mixtures thereof. More preferably, the ceria-containing material is ceria.

The CO slip catalyst preferably comprises 0.1 to 30 weight percent palladium, more preferably 0.5 to 5 weight percent palladium, and most preferably 1 to 4 weight percent palladium. The CO slip catalyst may contain other noble metals such as platinum and rhodium, but palladium is preferred as the only noble metal.

Preferably, the CO slip catalyst may further comprise promoters such as alkali metals and alkaline earth metals. Preferred alkaline earth metals include barium, calcium, strontium, or magnesium. Preferred alkali metals include potassium, sodium, lithium, or cesium. Other promoters such as copper and zinc may be added instead of, or in addition to, an alkali or alkaline earth metal promoter.

The CO slip catalyst may preferably comprise one or more inorganic oxide binders. Preferred inorganic oxide binders include alumina, silica, titania, zirconia, magnesia, niobia, tantalum oxide, molybdenum oxide, tungsten oxide, a mixed oxide or composite oxide of any two or more thereof (e.g. silica-alumina or magnesia-alumina), and mixtures thereof The CO slip catalyst is preferably coated on a substrate. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate may be a filter substrate or a flow-through substrate, and is most preferably a flow-through substrate, especially a honeycomb monolith. The substrate is typically designed to provide a number of channels through which vehicle exhaust passes. The surface of the channels is loaded with the catalyst.

The CO slip catalyst of the present invention may be prepared by processes well known in the art. The CO slip catalyst is preferably prepared to ensure a high level of interaction between the palladium particles and the ceria-containing material particles. This can be accomplished by impregnation on the ceria-containing material using a palladium compound (such as palladium nitrate) followed by a calcination treatment. Alternatively, this high interaction could be produced by means of co-precipitation of the palladium and ceria-containing material particles.

Preferably, the CO slip catalyst is prepared by depositing it on the substrate using washcoat procedures. A representative process for preparing the CO slip catalyst using a washcoat procedure is set forth below. It will be understood that the process below can be varied according to different embodiments of the invention.

The CO slip catalyst is preferably prepared using a washcoat procedure. A palladium compound (such as palladium acetate or palladium nitrate) is preferably added to the ceria-containing material and binder, if used, prior to the washcoating step. The palladium compound may be loaded onto the ceria-containing material by any known means, the manner of addition is not considered to be particularly critical. For example, the palladium compound may be added to the ceria-containing material by impregnation, adsorption, ion-exchange, incipient wetness, precipitation, or the like to produce a supported palladium material. Alternatively, the ceria-containing material and binder, if used, may be coated onto the substrate, followed by addition of the palladium compound to the coated substrate.

The washcoating is preferably performed by first slurrying finely divided particles of the supported palladium material (or just the ceria-containing material) and optional binder in an appropriate solvent, preferably water, to form the slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as promoters may also be incorporated in the slurry as a mixture of water soluble or water-dispersible compounds or complexes.

The substrate may then be coated one or more times with the slurry such that there will be deposited on the substrate the desired loading of catalytic materials on the catalyst. If only the ceria-containing material and optional binder is deposited on the substrate, the palladium compound may then be added to the coated substrate by any known means, including impregnation, adsorption, or ion-exchange of a platinum compound (such as platinum nitrate).

Preferably, the entire length of the substrate is coated with the slurry so that a washcoat of the CO slip catalyst covers the entire surface of the substrate.

After the catalyst is deposited onto the substrate, the CO slip catalyst is typically dried and then calcined by heating at an elevated temperature. Preferably, the calcination occurs at 300 to 700° C. for approximately 1 to 8 hours.

The CO slip catalyst may be a single-layered catalyst formulation or may be prepared as a multi-layer catalyst. For instance, the CO slip catalyst may be applied as two or more layers onto a substrate in which each layer has differing amounts of palladium and/or ceria-containing material. The CO slip catalyst may also be added as an underlayer or an overlayer on another catalyst component or as a rear zone of another catalyst component, such as an underlayer or a rear zone on a selective catalytic reduction catalyst.

The invention also includes a method of oxidizing excess CO in an exhaust gas, where the excess CO results from the periodic contact of an upstream catalyst under rich exhaust conditions. The method of the invention comprises contacting the excess CO with the CO slip catalyst at a temperature in the range of 100 to 700° C.

A typical manner of defining the compositional balance of an exhaust gas containing both oxidizing gases and reducing gases is the lambda ($\lambda$) value of the exhaust gas. The lambda value is defined as: actual engine air-to-fuel ratio/stoichiometric engine air-to-fuel ratio, wherein a lambda value of 1 represents a stoichiometrically balanced (or stoichiometric) exhaust gas composition. A lambda value greater than 1 ($\lambda>1$) represents an excess of $O_2$ and $NO_x$ and the composition is described as "lean." A lambda value of less than 1 ($\lambda<1$) represents an excess of hydrocarbons and CO and the composition is described as "rich."

In lean burn internal combustion engines, it is useful to operate under periodic rich exhaust conditions ($\lambda<1$) in order to regenerate exhaust catalyst components, to desorb $NO_x$ species that are adsorbed on a catalyst component, and to generate ammonia for use in other downstream catalyst components. For instance, during extended lean operation, the CO and hydrocarbons in the engine exhaust gas stream will be primarily oxidized to $CO_2$ and $H_2O$ over a three-way catalyst (TWC) component. Periodic rich events can be used to produce ammonia ($NH_3$) over the TWC. The $NH_3$ is stored and used by the downstream selective catalytic reduction (SCR) catalyst to selectively reduce the $NO_x$ generated during the lean phase. The duration of these rich events requires optimization to provide adequate quantities of $NH_3$ to the SCR to meet $NO_x$ conversion targets. As a consequence of longer rich events, the generation of excess CO is produced in the exhaust. The CO slip catalyst of the invention helps to oxidize this excess CO in order to maintain high conversion of CO during both lean and rich operating phases.

In the method of the invention, the excess CO results from the periodic contact of an upstream catalyst under rich exhaust conditions. Preferably, the upstream catalyst comprises a three-way catalyst (TWC).

Three-way catalyst systems are well-known in the art. TWCs typically perform three main functions: (1) oxidation of CO to $CO_2$; (2) oxidation of unburned fuels to $CO_2$ and $H_2O$; and (3) reduction of $NO_x$ to $N_2$. A three-way catalyst preferably comprises one or more platinum group metals and one or more inorganic oxide supports. The platinum group metal (PGM) is preferably platinum, palladium, rhodium, or mixtures thereof.

The inorganic oxide supports most commonly include oxides of Groups 2, 3, 4, 5, 6, 13 and 14 and lanthanide elements. Useful inorganic oxide supports preferably have surface areas in the range 10 to 700 $m^2/g$, pore volumes in the range 0.1 to 4 mL/g, and pore diameters from about 10 to 1000 Angstroms. The inorganic oxide support is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred. In addition to functioning as supports, a ceria-containing support, such as ceria ($CeO_2$) or a ceria-zirconia mixed, oxide may also function as an oxygen storage component (OSC) within the TWC. The inorganic oxide support may also be a zeolite, such as a beta zeolite, a ZSM zeolite, a ferrierite, or a chabazite The three-way catalyst is preferably coated on a substrate, as described above. The substrate may be a filter substrate or a flow-through substrate, and is most preferably a flow-through substrate, especially a honeycomb monolith. The substrate is typically designed to provide a number of channels through which vehicle exhaust passes. The surface of the channels is loaded with the three-way catalyst.

The three-way catalyst may be added to the substrate by any known means. For example, the inorganic oxide support or a PGM-containing support material may be applied and bonded to the substrate as a washcoat, in which a porous, high surface area layer is bonded to the surface of the substrate. The washcoat is typically applied to the substrate from a water-based slurry, then dried and calcined at high temperature. If only the inorganic oxide support is washcoated on the substrate, the PGM metal may be loaded onto the dried washcoat support layer (by impregnation, ion-exchange, or the like), then dried and calcined. Preferred loadings of PGM loaded onto a substrate are 0.02 to 1.7 g/liter (1 to 300 g/ft$^3$) catalyst volume.

The upstream catalyst preferably further comprises a selective catalytic reduction (SCR) catalyst that is located downstream of the TWC. A SCR catalyst is a catalyst that reduces $NO_x$ to $N_2$ by reaction with nitrogen compounds (such as ammonia or urea) or hydrocarbons (lean $NO_x$ reduction). Preferably, the SCR catalyst is comprised of a vanadia-titania catalyst, a vanadia-tungsta-titania catalyst, or a transition metal/molecular sieve catalyst. The transition metal/molecular sieve catalyst comprises a transition metal and a molecular sieve, such as aluminosilicate zeolites and silicoaluminophosphates.

Preferred transition metals include chromium, cerium manganese, iron, cobalt, nickel and copper, and mixtures of any two or more thereof. Iron and copper are particularly preferred. The molecular sieve is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the molecular sieve is a beta zeolite, a ferrierite, or a chabazite. Preferred SCR catalysts include Cu-CHA, such as Cu-SAPO-34, Cu-SSZ-13, and Fe-Beta zeolite.

The SCR catalyst is preferably coated on a ceramic or a metallic substrate. The substrate is typically designed to provide a number of channels through which vehicle exhaust passes, and the surface of the channels will be preferably be coated with the SCR catalyst.

The substrate for the SCR catalyst may be a filter substrate or a flow-through substrate. Preferably, the SCR catalyst is coated onto a filter. The combination of an SCR catalyst and a filter is known as a selective catalytic reduction filter. Selective catalytic reduction filters are single-substrate devices that combine the functionality of an SCR and particulate filter.

The following examples merely illustrate the invention. Those skilled in the art will recognize many variations that are within the spirit of the invention and scope of the claims.

Example 1: Preparation of Pd/Ceria CO Slip Catalyst

Catalyst 1 is prepared by coating a CO slip catalyst, having primary components of $CeO_2$, $Al_2O_3$, and Pd (3 wt. %), onto a cordierite honeycomb monolith.

Example 2: Laboratory Testing Procedures and Results

Catalyst 1 and a comparison standard Pd—Rh TWC are tested for CO oxidation activity. Reactor cores from the CO slip catalyst are evaluated fresh and hydrothermally aged at 750° C. for 16 hours, and compared to the performance of a fresh comparison standard TWC reactor core. The experiment is conducted using the following procedure.

Gas mixtures are prepared to simulate a lean (0% CO, 10% $O_2$, 5% $H_2O$, 8% $CO_2$) and a rich (1.5% CO, 0% $O_2$, 5% $H_2O$, 8% $CO_2$) condition during catalyst testing. Gas flow is controlled to achieve a space velocity of 30,000 hr$^{-1}$. During the test each sample is pre-conditioned in the lean gas mixture, where the catalyst inlet temperature is raised to 500° C. and maintained for 5 minutes. Following this pre-conditioning step, the catalyst is stabilized at 100° C. under lean conditions where the performance is measured during 10 cycles (5 minutes at lean conditions, 30 seconds at rich conditions). This cycled performance is also measured at 150, 200, 250, and 300° C. The results are shown at Table 1.

It can be seen that there is very little impact of hydrothermal aging upon CO conversion at nearly all temperatures investigated. This catalyst is also significantly better than a standard TWC at both fresh/aged conditions.

TABLE 1

Time for 1000 ppm CO slip at varying temperatures

| Catalyst | Time for 1000 ppm CO slip (seconds) | | | | |
|---|---|---|---|---|---|
| | 100° C. | 150° C. | 200° C. | 250° C. | 300° C. |
| Fresh TWC * | 2 | 3 | 5.5 | 7 | 10.5 |
| Cat. 1 - fresh | 14.5 | 18.25 | 20.5 | 24.75 | 26.25 |
| Cat. 1 - aged | 17.5 | 19.75 | 21 | 24.25 | 24.75 |

* Comparison Example

We claim:

1. An exhaust system for treating an exhaust gas from a lean burn internal combustion engine, said exhaust system comprising an upstream three-way catalyst and a CO slip catalyst,
   wherein the three-way catalyst comprises one or more platinum group metals and one or more inorganic oxide supports and is formulated to: (1) oxidize CO to $CO_2$; (2) oxidize unburned fuels to $CO_2$ and $H_2O$; and (3) reduce NOx to $N_2$;
   wherein the CO slip catalyst is formulated to oxidize excess CO and comprises palladium and a ceria-containing material, and wherein the CO slip catalyst is located downstream of the upstream catalyst; and
   wherein the upstream catalyst further comprises a selective catalytic reduction catalyst located downstream of the three-way catalyst, wherein the selective catalytic reduction catalyst is formulated to reduce NOx to $N_2$ and comprises a vanadia-titania catalyst, a vanadia-tungsta-titania catalyst, a transition metal/molecular sieve catalyst, or combinations thereof.

2. The system of claim 1, wherein the ceria-containing material comprises ceria, ceria-zirconia, ceria-zirconia-alumina, and mixtures thereof.

3. The system of claim 1, wherein the CO slip catalyst comprises 0.5 to 5 weight percent palladium.

4. The system of claim 1, wherein the CO slip catalyst further comprises one or more alkali or alkaline earth metals.

5. The system of claim 1, wherein the CO slip catalyst further comprises one or more inorganic oxide binders selected from the group consisting of alumina, silica, titania, zirconia, magnesia, niobia, tantalum oxide, molybdenum oxide, tungsten oxide, and mixed oxides of any two or more thereof.

6. The system of claim 1, wherein the CO slip catalyst is coated on a substrate.

7. The system of claim 6, wherein the substrate is a ceramic substrate or a metallic substrate.

* * * * *